(12) United States Patent
Uno

(10) Patent No.: US 7,065,434 B2
(45) Date of Patent: Jun. 20, 2006

(54) BICYCLE ELECTRONIC CONTROL DEVICE WITH A RESET FUNCTION

(75) Inventor: Kouji Uno, Osaka (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/707,176

(22) Filed: Nov. 25, 2003

(65) Prior Publication Data

US 2004/0113385 A1    Jun. 17, 2004

(30) Foreign Application Priority Data

Nov. 28, 2002    (JP)    ............................. 2002-345090

(51) Int. Cl.
B62K 11/00    (2006.01)
B62M 7/00    (2006.01)
(52) U.S. Cl. ............................. 701/36; 701/70; 474/70
(58) Field of Classification Search .................. 701/36, 701/70, 93, 79, 83; 474/70, 80, 154; 180/206, 180/207, 220, 65.8; 70/39, 233
See application file for complete search history.

(56) References Cited

U.S. PATENT DOCUMENTS

| | | | |
|---|---|---|---|
| 4,364,448 A * | 12/1982 | Ikuma | 180/206 |
| 4,952,196 A | 8/1990 | Chilcote et al. | |
| 5,226,501 A * | 7/1993 | Takata | 180/206 |
| 5,351,185 A * | 9/1994 | Takeuchi et al. | 700/79 |
| 5,408,212 A * | 4/1995 | Meyers et al. | 340/427 |
| 5,682,314 A | 10/1997 | Nishino et al. | |
| 5,806,621 A * | 9/1998 | Soda et al. | 180/206 |
| 6,003,140 A | 12/1999 | Pientka et al. | |
| 6,449,554 B1 * | 9/2002 | Yamawaki | 701/93 |

FOREIGN PATENT DOCUMENTS

| | | |
|---|---|---|
| EP | 696737 A1 | 2/1996 |
| EP | 786400 A2 | 7/1997 |
| EP | 899188 A2 | 3/1999 |
| JP | 6-255563 A | 9/1994 |
| JP | 08-026157 A | 1/1996 |
| JP | 10-181670 A | 7/1998 |
| JP | 10-181671 A | 7/1998 |
| JP | 2000-25680 A | 1/2000 |
| JP | 2001-171575 A | 6/2001 |
| JP | 2002-099357 A | 4/2002 |
| JP | 2002-099358 A | 4/2002 |

* cited by examiner

*Primary Examiner*—Dalena Tran
(74) *Attorney, Agent, or Firm*—James A. Deland

(57) ABSTRACT

An electronic control device for controlling a controlled device installed on a bicycle comprises a programmed computer that controls the control device. A reset circuit receives information related to a traveling condition of the bicycle and provides a reset signal to the computer in response to the occurrence of a predetermined traveling condition.

27 Claims, 8 Drawing Sheets

BICYCLE ELECTRONIC CONTROL DEVICE WITH A RESET FUNCTION

BACKGROUND OF INVENTION

The present invention is directed to bicycles and, more particularly, to electronic control devices for bicycles.

Recently, some bicycles have been equipped with electronic control devices that have built-in computer chips. Examples of such control devices include devices for automatically shifting gearshift devices depending on bicycle speed, and devices for controlling display devices that display bicycle speed, travel distance, and the like.

Sometimes a programmed microprocessor may experience a system error due to electrical noise or some other disturbance, or to a programming bug or the like, thus causing the program to enter the wrong routine and causing the gearshift devices and/or display devices to malfunction, for example. Some electronic control devices are equipped with a reset switch to return the microprocessor to the appropriate routine. Conventional reset switches include those disposed inside the control device but visible through a round access hole, typically about 2 mm in diameter, wherein reset switch is pressed using the tip of a ballpoint pen or some other pointed object. Operating the reset switch sends a reset signal to the reset terminal of the microprocessor, and the microprocessor resets accordingly.

Since a bicycle typically is used outdoors, such a reset switch creates the risk of water and dust entering the access hole and into the control device. Also, since the access hole is relatively small, it is not possible to perform the reset operation if no pointed object for performing the reset operation is readily available, thus creating great inconvenience to the rider.

Some devices address such problems by eliminating the manually operated reset switch entirely. In these devices, it is necessary to carry out the reset operation by interrupting the power supply, such as by disconnecting a battery used as the power supply. However, this requires a substantial amount of work by the rider, thus also creating great inconvenience to the rider.

SUMMARY OF INVENTION

The present invention is directed to various features of a bicycle control device that has a reset function. In one embodiment, an electronic control device for controlling a controlled device installed on a bicycle comprises a programmed computer that controls the control device. A reset circuit that receives information related to a traveling condition of the bicycle provides a reset signal to the computer in response to the occurrence of a predetermined traveling condition. Additional inventive features will become apparent from the description below, and such features alone or in combination with the above features may form the basis of further inventions as recited in the claims and their equivalents.

DETAILED DESCRIPTION

Figure 1:
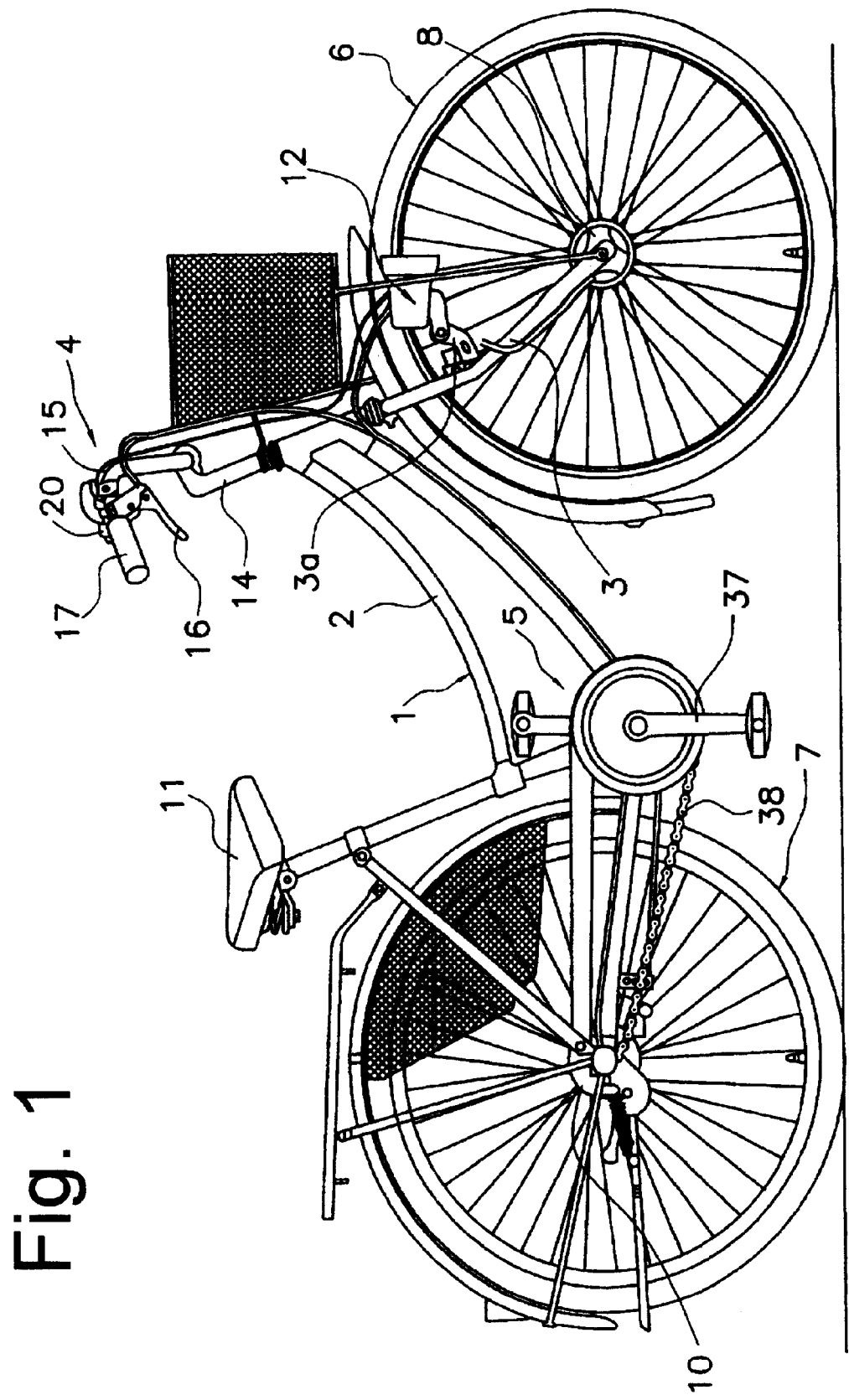
FIG. 1 is a side view of a particular embodiment of a bicycle.

FIG. 1 is a side view of a particular embodiment of a bicycle. This bicycle is a recreational bicycle comprising a frame 1 having a double-loop frame body 2 formed from welded tubes, a front fork 3 mounted to the frame body 2 for rotation around a diagonal axis, a handlebar component 4, a drive component 5, a front wheel 6 on which a dynamo hub 8 with brakes is mounted, a rear wheel 7 on which an internal shifting hub 10 is mounted, a saddle 11, a shift control unit 12 to control shifting of the internal shifting hub 10, and a shift controller 20 for manually operating the shift control unit 12.

Figure 2:
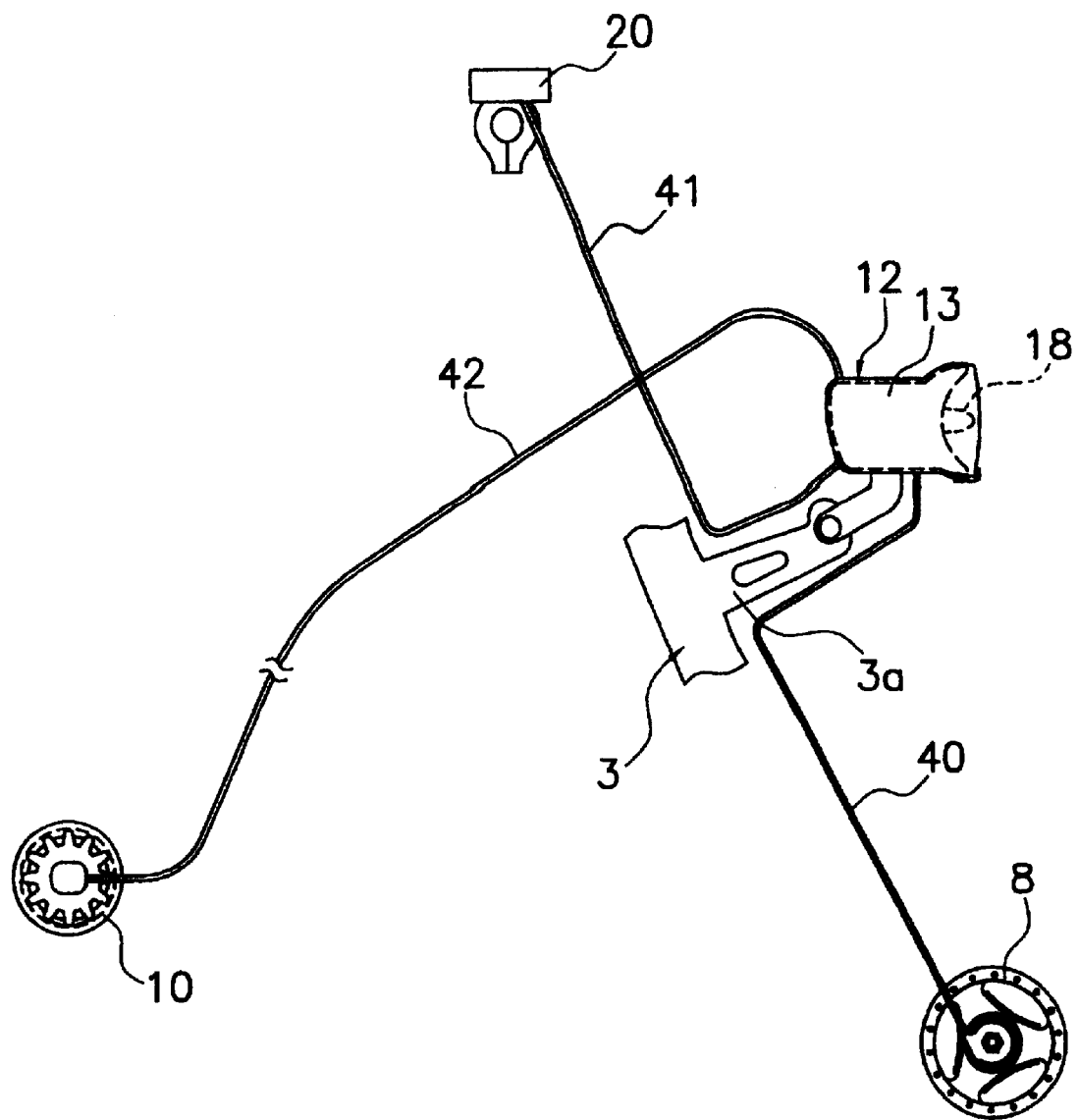
FIG. 2 illustrates connections among an internal hub transmission, a shift control unit, and a hub dynamo.

The handlebar component 4 comprises a handle stem 14, fastened to the upper part of the front fork 3, and a handlebar 15 fastened to the handle stem 14. Brake levers 16 and grips 17 are mounted on both ends of the handlebar 15. In this embodiment, the shift controller 20 is integrated with the right-side brake lever 16. The drive component 5 comprises a crank 37, mounted on the lower part (bottom bracket component) of the frame body 2, and a chain 38 that engages the crank 37 and the internal shifting hub 10. The internal shifting hub 10 is capable of producing three speed steps, including a low speed step (speed 1), an intermediate speed step (speed 2), and a high speed step (speed 3). These three speed steps can be selected by means of a motor unit 29 (FIG. 3) in the shift control unit 12. The dynamo hub 8 of the front wheel 6 can be fitted with a roller-type front brake, and it houses an alternating current dynamo 19 (FIG. 6) that generates electricity in response to the rotation of the front wheel 6. As shown in FIG. 2, the shift control unit 12 is electrically connected to the alternating current dynamo 19 housed in the dynamo hub 8 by electrical wiring 40, and it is electrically connected to the shift controller 20 by electrical wiring 41. The shift control unit 12 is mechanically connected to the internal shifting hub 10 by a shift control cable 42.

Figure 3:
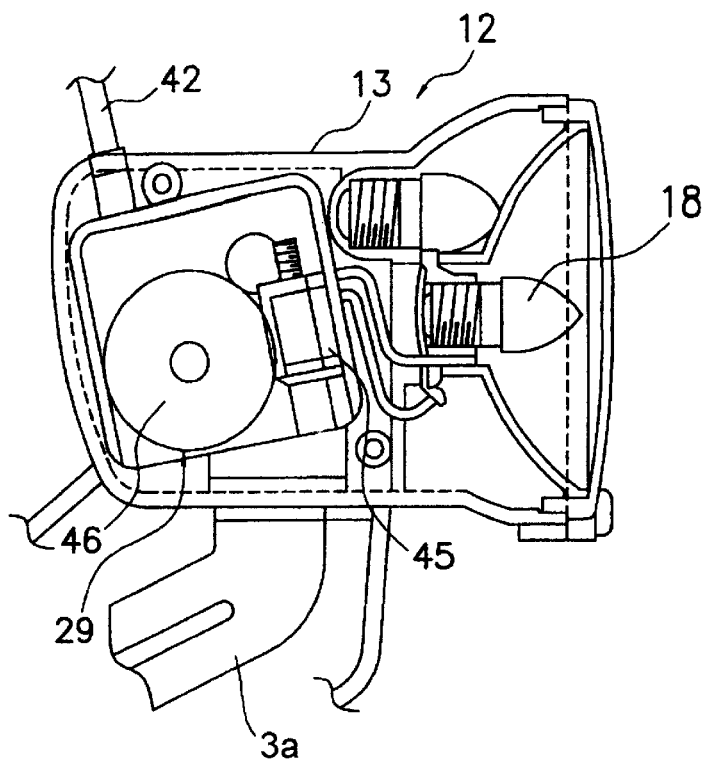
FIG. 3 is a side view of components in the shift control unit.
Figure 4:
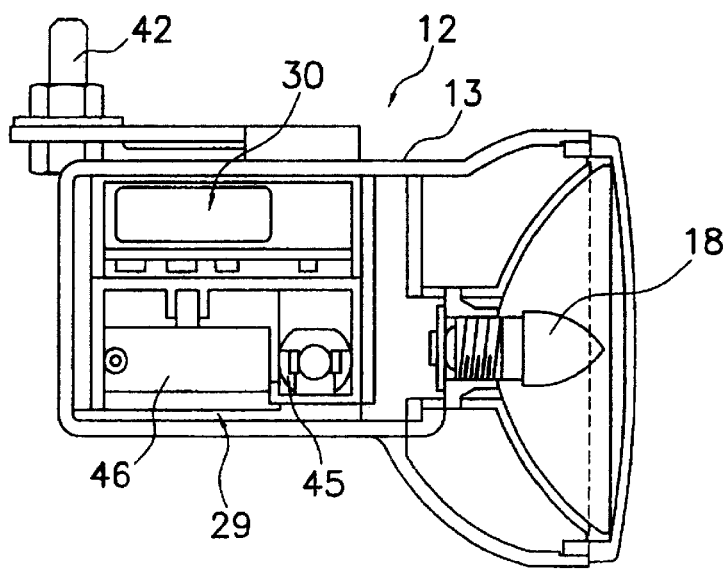
FIG. 4 is a top view of components in the shift control unit.

As shown in FIGS. 3 and 4, the shift control unit 12 comprises a lamp case 13 mounted to a lamp stay 3a located midway along the front fork 3 for housing a lamp 18. The motor unit 29 and a circuit unit 30 are housed in the lamp case 13. The motor unit 29 comprises an electric shifting motor 45, a cable operating component 46 which moves into three shifting positions by means of the shifting motor 45, and a position sensor 47 (FIG. 6) to detect the shift position of the cable operating component 46. One end of the shift control cable 42 is connected to cable operating component 46. The circuit unit 30 comprises a control element 25 (FIG. 6) containing a microprocessor 50 (FIG. 7) comprising a CPU, RAM, ROM, and an I/O interface.

Figure 5:
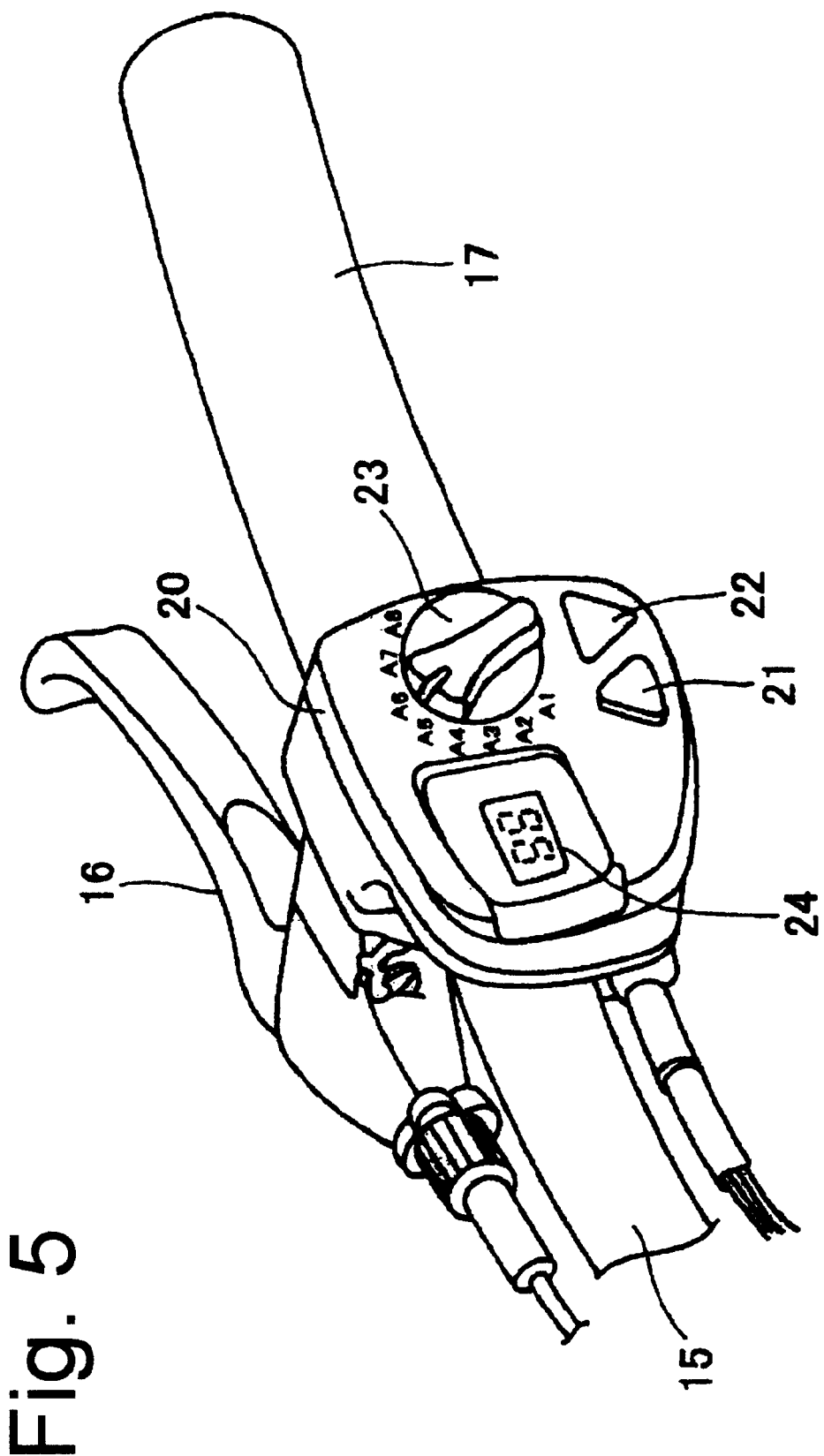
FIG. 5 is a more detailed view of a shift controller mounted to the handlebar.

As shown in FIG. 5, the shift controller 20 comprises two operating buttons 21 and 22 in the form of triangular pushbuttons disposed next to each other, an operating dial 23 disposed above the operating buttons 21 and 22, and a liquid crystal display device 24 disposed to the left of the operating dial 23. The operating button 21 on the left side may be used for manually shifting from the low speed step to the intermediate speed step and to the high speed step. The operating button 22 on the right side may be used for manually shifting from the high speed step to the intermediate speed step and to the low speed step. The operating buttons 21 and 22 also may be used to lock the internal shifting hub 10 in the low speed step regardless of bicycle speed, or to limit the operation of the internal shifting hub 10 to the upper or lower two adjacent speed steps.

The operating dial 23 is used for switching between eight automatic shifting modes (A1–A8) using eight detent positions. The eight automatic shifting modes (A1–A8) are modes for automatically shifting the internal shifting hub 10 according to a bicycle speed signal derived from the alternating current dynamo 19. The eight automatic shifting modes (A1–A8) are designed to allow the rider to set shift timing (i.e., the threshold speed values at which shifting will occur) for upshifting (shifting from low speed to high speed) and downshifting (shifting from high speed to low speed) according to the rider's desire and physical capability.

Figure 6:
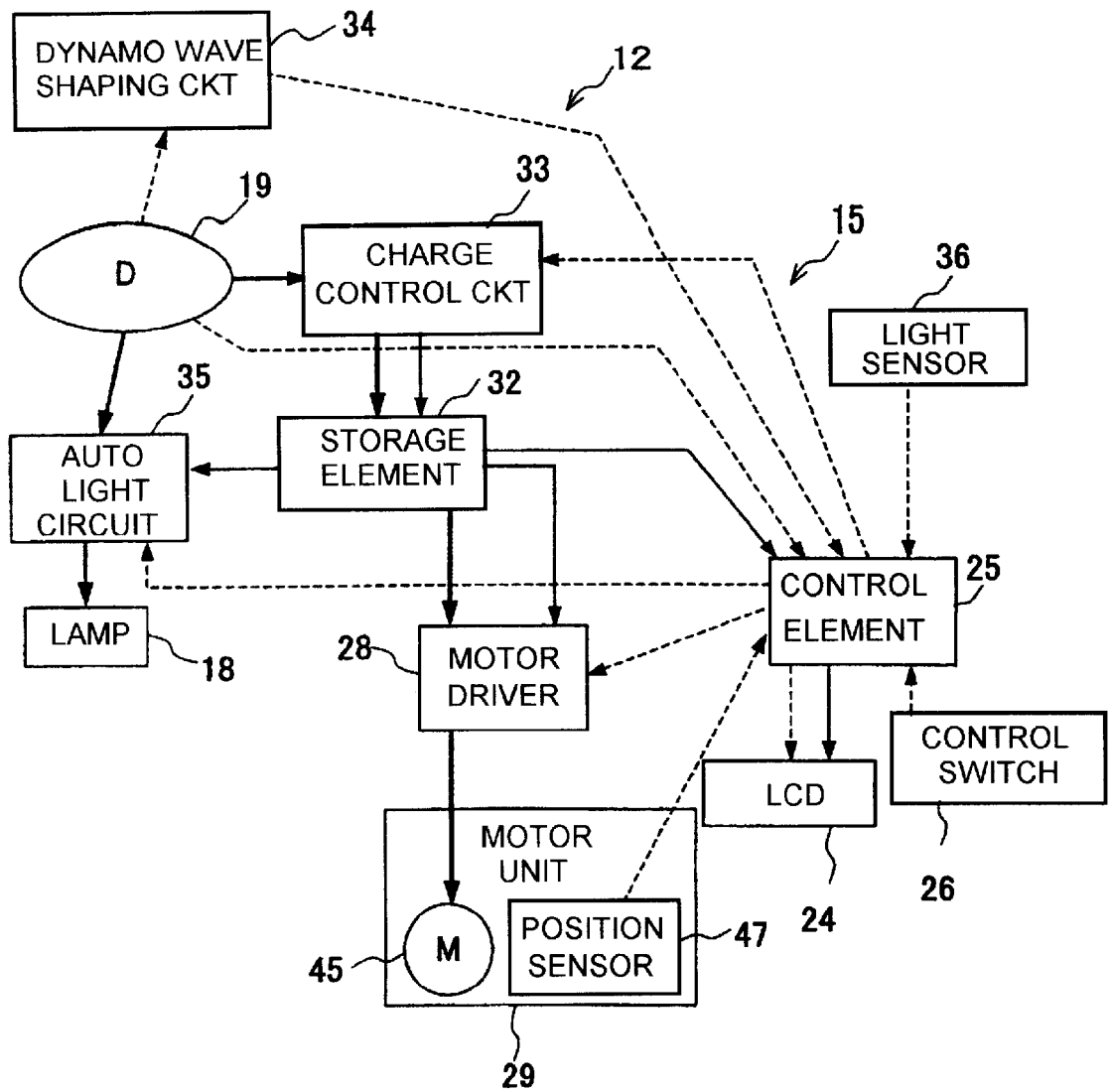
FIG. 6 is a schematic block diagram of the electronic components of the shift control unit.

FIG. 6 is a block diagram illustrating the structure of the overall bicycle control system. Heavy lines in FIG. 6 indicate lines carrying about 1 A of current, solid lines indicate lines carrying about 5 mA of current, and dotted lines indicate signal lines. Control element 25 is operatively coupled to an operating switch 26 (which schematically represents the operating dial 23 and operating buttons 21 and 22 in the shift controller 20); to the liquid crystal display device 24; to a motor driver 28; to a power storage element 32; to a charge control circuit 33; to a dynamo waveform shaping circuit 34 that generates a speed signal derived from the output of the alternating current dynamo 19; to an auto light circuit 35 to the light sensor 36 (illumination sensor) for controlling the operation of lamp 18; to the position sensor 47 of the motor unit 29, and to other input/output components.

Control element 25 includes a programmed microprocessor 50 (FIG. 7) that automatically controls shifting of the internal shifting hub 10 via motor driver 28 and motor unit 29 according to travel speed, and it controls the information (e.g., bicycle speed and speed step) displayed on the liquid crystal display device 24 disposed in the shift controller 20. Motor driver 28 operates on a 1 mA current supplied by the power-storage element 32, and it controls a 1 A current supplied by the power storage element 32 to operate the shifting motor 45. In this embodiment, liquid crystal display 24 has a microprocessor (not shown) separate from the microprocessor 50 of the control element 25, and that microprocessor is designed to carry out display control on the basis of information from control element 25.

Control element 25 also controls lamp 18 through auto light circuit 35 by turning lamp 18 on when surrounding light conditions fall below a certain prescribed brightness, and by turning lamp 18 off when surrounding light conditions are above the prescribed brightness. More specifically, auto light circuit 35 supplies or interrupts the 1A current output from the alternating current dynamo 19 to the lamp 18 in response to on/off signal output from control element 25. Control element 25 generates these signal based on the signals from the light sensor 36 in such a manner that lamp 18 is switched on automatically when light levels fall below a prescribed limit, and lamp 18 is switched off when light levels exceed the prescribed limit.

The charge control circuit 33 comprises, for example, a half-wave rectifier circuit that rectifies an alternating current output from the alternating current dynamo 19 to a direct current that supplies power storage element 32. The power storage element 32 may comprise, for example, a high-capacity capacitor that stores the direct current power that is output from the charg control circuit 33. The power storage element 32 also may comprise secondary batteries such as nickel cadmium batteries, lithium ion batteries, nickel-metal hydride batteries, etc., in lieu of a capacitor.

Battery replacement and recharging are unnecessary because the power storage element 32 stores electrical power from the alternating current dynamo 19, and components such as the control element 25 are operated using this electrical power. Monitoring remaining battery power and carrying along spare batteries also become unnecessary, and shifting can be done automatically without performing the cumbersome procedures required by conventional power sources. The electrical power from the alternating current dynamo 19, which conventionally is not employed in the daytime, can be put to effective use in the shift control unit 12.

The dynamo waveform shaping circuit 34 forms a speed signal from the alternating current output from the alternating current dynamo 19. More specifically, a half-cycle is extracted from a sine wave alternating current signal, passed through a Schmitt circuit or other appropriate waveform shaping circuit, and formed into a pulse signal corresponding to speed. Control element 25 uses this signal to control the automatic shifting of the internal shifting hub 10 without requiring a separate speed sensor.

Because alternating current dynamos generally have a plurality of circumferentially disposed magnetic poles, the alternating current dynamo outputs an alternating current signal with a frequency related to the bicycle speed and the number of magnetic poles. Consequently, it is possible to obtain a larger number of signal pulses from the alternating current signal during each wheel rotation in comparison with a speed signal obtainable, for example, from a conventional speed sensor that detects a magnet mounted to the bicycle wheel. Therefore, the bicycle speed can be accurately detected within the space of one wheel rotation, and shifting can be controlled in real time with high precision. Furthermore, since shifting is controlled based on the alternating current signal from the alternating current dynamo 19, it is no longer necessary to dispose the shift control unit 12 in the vicinity of the bicycle wheel. No limitation is placed on the mounting position of the shift control unit 12.

Figure 7:
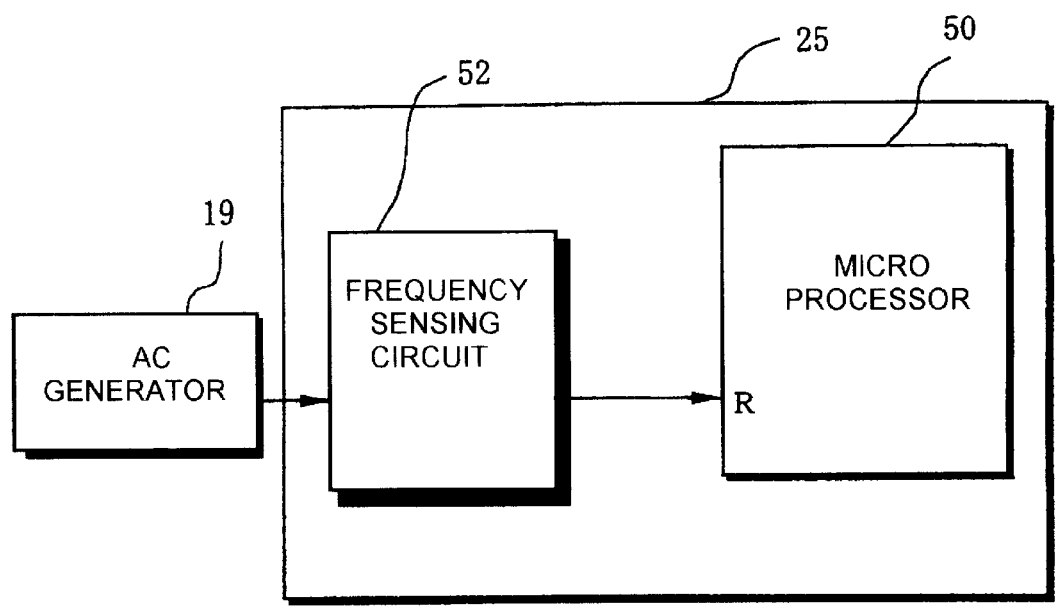
FIG. 7 is a block diagram of a particular embodiment of a control element with a reset function.

As shown in FIG. 7, in this embodiment control element 25 includes a frequency sensing circuit 52 connected to the alternating current generator 19 and to a reset terminal R of microprocessor 50. Frequency sensing circuit 52 senses the frequency of the alternating current signal output by alternating current generator 19. When the frequency satisfies a certain predetermined condition (e.g., when the frequency falls below a predetermined frequency level such as 5 Hz), a High signal that is normally output to microprocessor 50 changes to a Low signal. Microprocessor 50 is designed to reset when a Low signal is input to reset terminal R. As a result, microprocessor 50 resets when the frequency of alternating current generator 19 falls below a predetermined level (i.e., when bicycle speed falls below a predetermined level). Thus, if microprocessor 50 encounters a system error, it will perform a reset operation without the need for a manual reset procedure that imposes a burden on the rider.

Figure 8:
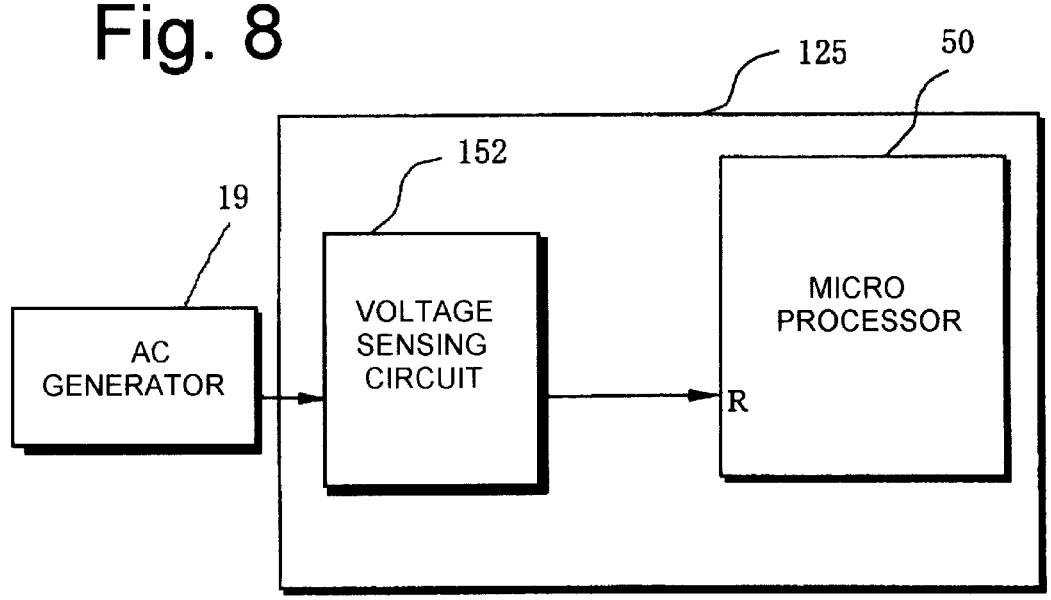
FIGS. 8–11 are block diagrams of additional embodiments of a control element with a reset function.

In this embodiment, microprocessor 50 is reset when the frequency of the signal output by alternating current generator 19 falls below a predetermined level. However, it should be understood that microprocessor 50 may be reset upon the occurrence of any travel condition of the bicycle or rider. For example, FIG. 8 shows an embodiment wherein a voltage sensing circuit 152 is connected to the alternating current generator 19 and to the reset terminal R of microprocessor 50. Voltage sensing circuit 152 could comprise, for example, an ordinary smoothing circuit employing a capacitor and diode series-connected with a Schmitt trigger circuit. When the output voltage of alternating current generator 19 meets a certain predetermined condition (e.g., when the output voltage falls below a predetermined voltage such as 2 volts), a High signal that is normally output to microprocessor 50 changes to a Low signal. Since microprocessor 50 is designed to reset when a Low signal is input to reset terminal R, microprocessor 50 resets when the voltage of alternating current generator 19 falls below the predetermined level (i.e., when bicycle speed falls below a predetermined level).

Figure 9:
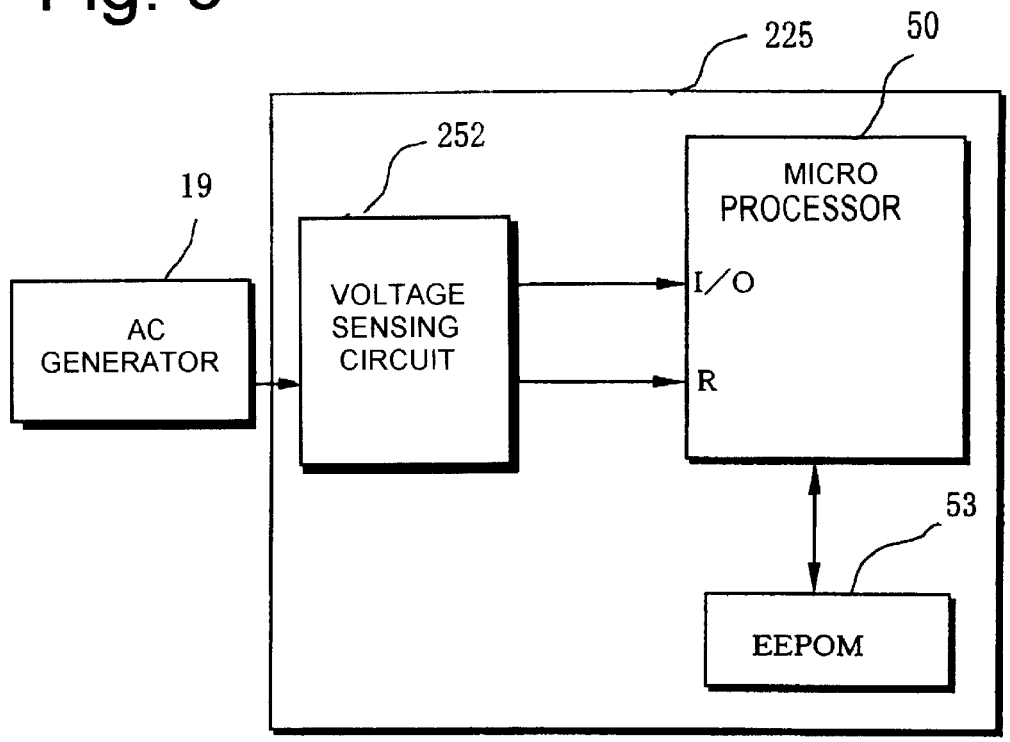

FIG. 9 is a block diagram of another embodiment of a control element 25 with a reset function. In this embodiment, microprocessor 50 may be connected to a non-volatile memory such as an EEPROM 53. Various operating information may be stored in EEPROM 53 prior to reset, and the stored information may be returned to the microprocessor 50 after the reset operation has completed. More specifically, in this embodiment a voltage sensing circuit 252 is connected to the reset terminal R of microprocessor 50 and also to an input/output (I/O) terminal of microprocessor 50. When a certain predetermined condition is met (e.g., when the voltage of alternating current generator 19 falls below a predetermined level), voltage sensing circuit 252 outputs a reset warning signal to the I/O terminal of microprocessor 50. Upon receiving the reset warning signal, microprocessor 50 stores in EEPROM 53 certain data currently stored in RAM (such as cumulative distance traveled, maximum speed data, current shift position, various display data, data for the selected shift mode, etc.). After outputting the reset warning signal, voltage sensing circuit 252 waits for a time interval sufficient for the required information to be stored in EEPROM 53 (e.g., 2 seconds), and then changes the High signal normally output to the reset terminal R of microprocessor 50 into a Low signal. Since microprocessor 50 is designed to reset when a Low signal is input to reset terminal R, microprocessor 50 resets when the voltage of alternating current generator 19 falls below the predetermined level (i.e., when bicycle speed falls below a predetermined level). When the microprocessor 50 initializes after reset, the contents of EEPROM 53 are read out and placed in the RAM of microprocessor 50. As a result, it is possible to save information that ordinarily would be lost during reset, and the bicycle operation may resume smoothly subsequent to reset.

Figure 10:
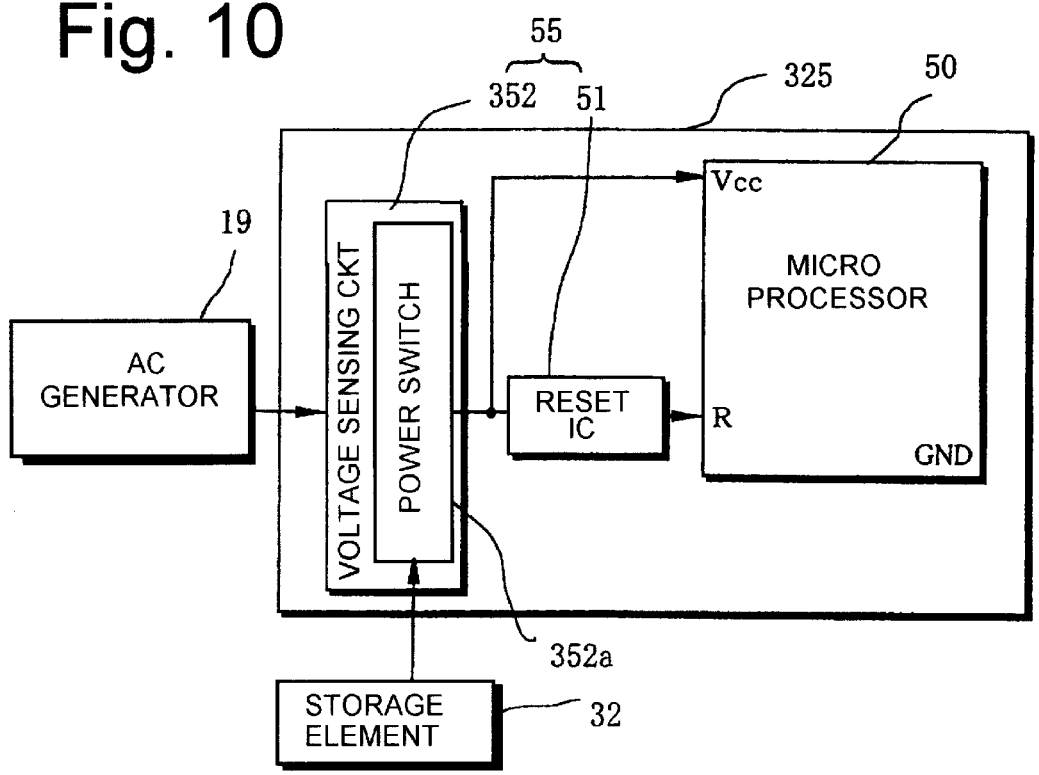

In the above embodiments, a reset signal is output directly to microprocessor 50 by a reset circuit such as a frequency sensing circuit 52 or a voltage sensing circuit 152 or 252 once a predetermined condition has been met. Alternatively, as shown in FIG. 10, a reset circuit 55 may comprise a voltage sensing circuit 352 and a reset integrated circuit (IC) 51, wherein voltage sensing circuit 352 may function as a reset activating circuit, and reset IC 51 may function as a separate reset signal output circuit. In this embodiment, reset IC 51 outputs a reset signal to microprocessor 50 when voltage sensing circuit 352 interrupts power to reset IC 51.

In this embodiment, voltage sensing circuit 352 has a power switch 352a connected to power storage element 32, to reset IC 51 and to a power supply terminal Vcc of microprocessor 50. In the presence of a predetermined condition like those described previously, power switch 352a interrupts the supply of power to reset IC 51 and to the power supply terminal Vcc of microprocessor 50, and a reset signal is output to microprocessor 50 by reset IC 51. Once the predetermined condition is no longer met (e.g., the bicycle begins to move at speed faster than a predetermined level), power switch 352a turns on power to reset IC 51 and microprocessor 50, and microprocessor 50 is reset. Thus, microprocessor 50 may resume normal operation once the power level has stabilized.

Figure 11:
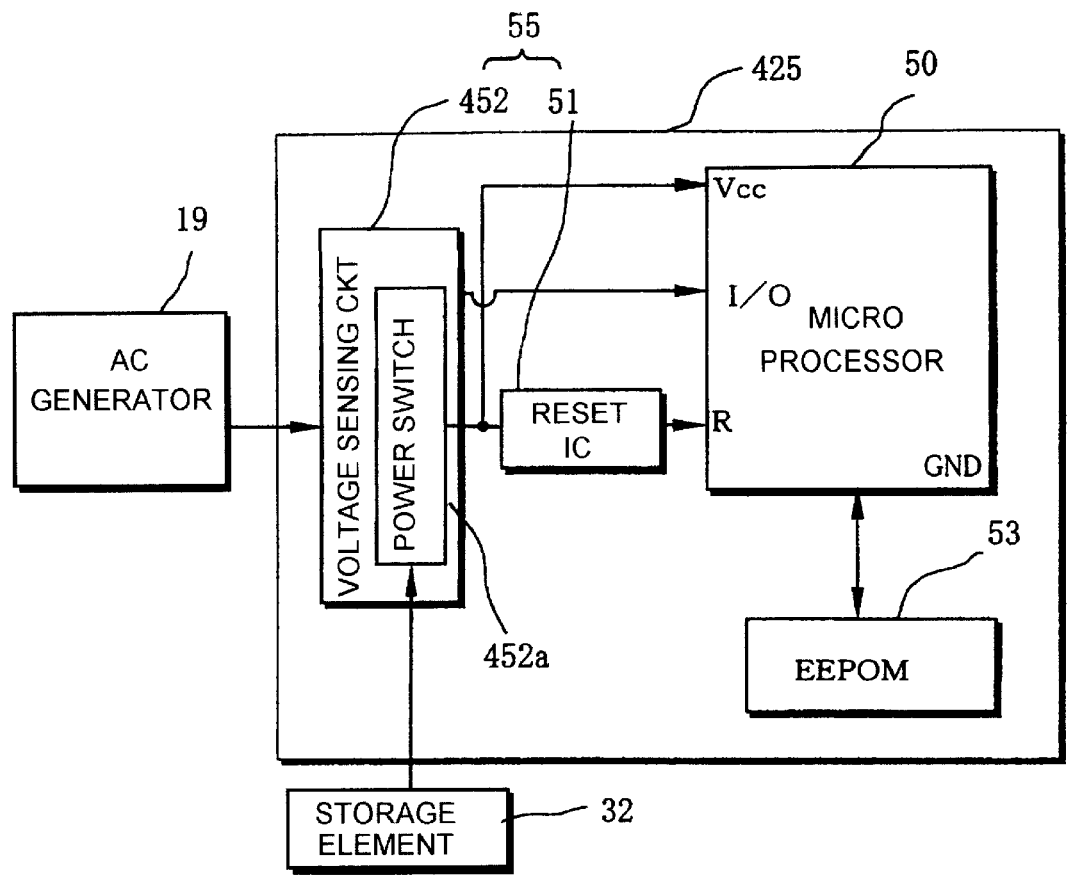

FIG. 11, is a block diagram of another embodiment of a control element 25 similar to the embodiment shown in FIG. 10, wherein features similar to that shown in FIG. 9 are added. As shown in FIG. 11, reset IC 51 and EEPROM 53 are connected to microprocessor 50, and a voltage sensing circuit 452 has a power switch 452a connected to power storage element 32, to reset IC 51 and to the power supply terminal Vcc of microprocessor 50. Voltage sensing circuit 452 also is connected to the I/O terminal of microprocessor 50 to provide a reset warning signal to microprocessor 50.

When a predetermined condition is met, voltage sensing circuit 452 outputs a reset warning signal to the I/O terminal of microprocessor 50. Information to be saved then is output from RAM in microprocessor 50 to EEPROM 53, where it is stored. After a predetermined time interval, power switch 452a turns off power to reset IC 51 and microprocessor 50, and a reset signal is output to microprocessor 50 by reset IC 51. Once the predetermined condition is no longer met (e.g., the bicycle begins to move at speed faster than a predetermined level), power switch 452a turns on power to reset IC 51 and microprocessor 50, and microprocessor 50 is reset. Thus, microprocessor 50 may resume normal operation once the power level has stabilized.

While the above is a description of various embodiments of inventive features, further modifications may be employed without departing from the spirit and scope of the present invention. For example, the frequency and voltage values of the predetermined conditions disclosed in the above embodiments are merely exemplary, and the invention is not limited to these parameters. In the above embodiments, a predetermined condition is determined to have been met when voltage or frequency passes a predetermined level, but instead a predetermined condition could be determined to have been met when voltage or frequency passes a predetermined level for a predetermined time interval.

In the above embodiments, it is determined from alternating current generator voltage or frequency that the travel information satisfies a predetermined condition, but a predetermined condition could be ascertained from various sensors such as a wheel speed sensor or a crank rotation sensor. Also, while a control device directed to a bicycle gearshift device was described, inventive features also would be found by applying the teachings herein to control devices for controlling other controlled devices, such as a display device or a suspension device.

Power from an alternating current generator 19 disposed in a dynamo hub 8 having good generating efficiency and low travel resistance was described in the above embodiments, but an alternating current generator that generates power through contact with the wheel rim or tire could be used. An ordinary secondary cell also could be used to supply power.

The size, shape, location or orientation of the various components may be changed as desired. Components that are shown directly connected or contacting each other may have intermediate structures disposed between them. The functions of one element may be performed by two, and vice versa (e.g., reset IC 51 was a separate chip from microprocessor 50 in the disclosed embodiments, but alternatively these could be placed on a single chip). The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. An electronic control device for controlling a controlled bicycle device installed on a bicycle, wherein the control device comprises:
   a programmed computer that is programmed to control a controlled bicycle device; and
   a reset circuit that receives information related to a traveling condition of the bicycle and provides a reset signal to the computer to reset the computer in response to the occurrence of a predetermined traveling condition of the bicycle and without dependence on the operation of the control device.

2. The device according to claim 1 wherein the traveling condition comprises bicycle speed.

3. The device according to claim 2 wherein the predetermined traveling condition comprises the bicycle speed being below a predetermined value.

4. The device according to claim 1 wherein the traveling condition comprises a signal output by an alternating current generator.

5. The device according to claim 4 wherein the traveling condition comprises a frequency output by the alternating current generator.

6. The device according to claim 4 wherein the traveling condition comprises a voltage output by an alternating current generator.

7. The device according to claim 1 wherein the reset circuit comprises:
   a reset signal output circuit; and
   a reset activating circuit that activates the reset signal output circuit in response to the occurrence of the predetermined traveling condition.

8. An electronic control device for controlling a controlled device installed on a bicycle, wherein the control device comprises:
   a programmed computer that controls the control device; and
   a reset circuit that receives information related to a traveling condition of the bicycle and provides a reset signal to the computer in response to the occurrence of a predetermined traveling condition;
   wherein the traveling condition comprises a frequency output by an alternating current generator; and
   wherein the predetermined traveling condition comprises the frequency output by the alternating current generator being below a predetermined value.

9. An electronic control device for controlling a controlled device installed on a bicycle, wherein the control device comprises:
   a programmed computer that controls the control device; and
   a reset circuit that receives information related to a traveling condition of the bicycle and provides a reset signal to the computer in response to the occurrence of a predetermined traveling condition;
   wherein the traveling condition comprises a voltage output by an alternating current generator;
   wherein the predetermined traveling condition comprises the voltage output by the alternating current generator being below a predetermined value.

10. An electronic control device for controlling a controlled device installed on a bicycle, wherein the control device comprises:
    a programmed computer that controls the control device; and
    a reset circuit that receives information related to a traveling condition of the bicycle and provides a reset signal to the computer in response to the occurrence of a predetermined traveling condition;
    wherein the reset circuit provides a reset warning signal prior to providing the reset signal.

11. The device according to claim 10 wherein the reset circuit provides the reset signal a predetermined time interval after providing the reset warning signal.

12. The device according to claim 10 further comprising a memory coupled to the computer, and wherein the computer stores operating information in the memory in response to the reset warning signal.

13. The device according to claim 12 wherein the memory comprises a nonvolatile memory.

14. The device according to claim 10 wherein the reset circuit switches a power signal to the computer to a predetermined state in response to the occurrence of the predetermined traveling condition.

15. The device according to claim 14 wherein the reset signal and the power signal comprise separate signals.

16. The device according to claim 14 wherein the reset circuit switches the power signal off in response to the occurrence of the predetermined traveling condition.

17. An electronic control device for controlling a controlled device installed on a bicycle, wherein the control device comprises:
    a programmed computer that controls the control device; and
    a reset circuit that receives information related to a traveling condition of the bicycle and provides a reset signal to the computer in response to the occurrence of a predetermined traveling condition and without dependence on the operation of the control device;
    wherein the reset circuit switches a power signal to the computer to a predetermined state in response to the occurrence of the predetermined traveling condition.

18. The device according to claim 17 wherein the reset circuit switches the power signal off in response to the occurrence of the predetermined traveling condition.

19. The device according to claim 17 wherein the reset signal and the power signal comprise separate signals.

20. The device according to claim 17 wherein the power signal comprises a direct current signal.

21. An electronic control device for controlling a controlled device installed on a bicycle, wherein the control device comprises:
    a programmed computer that controls the control device;
    a reset circuit that receives information related to a traveling condition of the bicycle and provides a reset signal to the computer in response to the occurrence of a predetermined traveling condition;
    wherein the reset circuit switches a direct current power signal to the computer to a predetermined state in response to the occurrence of the predetermined traveling condition; and a rectifier for rectifying an alternating current signal from a dynamo installed on the bicycle into the direct current signal.

22. An electronic control device for controlling a controlled device installed on a bicycle, wherein the control device comprises:
   a programmed computer that controls the control device; and
   a reset circuit that receives information related to a traveling condition of the bicycle and provides a reset signal to the computer in response to the occurrence of a predetermined traveling condition and without dependence on the operation of the control device;
   wherein the reset activating circuit comprises:
      a reset signal output circuit;
      a reset activating circuit that activates the reset signal output circuit in response to the occurrence of the predetermined traveling condition; and
      a power switching circuit that switches power to the reset activating circuit to a predetermined state in response to the occurrence of the predetermined traveling condition.

23. The device according to claim 22 wherein the reset activating circuit switches a power signal off to the reset activating circuit in response to the occurrence of the predetermined traveling condition.

24. An electronic control device for controlling a controlled device installed on a bicycle, wherein the control device comprises:
   a programmed computer that controls the control device; and
   a reset circuit that receives information related to a traveling condition of the bicycle and provides a reset signal to the computer in response to the occurrence of a predetermined traveling condition, wherein the reset circuit comprises:
      a reset signal output circuit; and
      a reset activating circuit that activates the reset signal output circuit in response to the occurrence of the predetermined traveling condition, wherein the reset activating circuit comprises a power switching circuit that switches power to the reset activating circuit to a predetermined state in response to the occurrence of the predetermined traveling condition;
      wherein the reset circuit provides a reset warning signal prior to providing the reset signal.

25. An electronic control device for controlling a controlled device installed on a bicycle, wherein the control device comprises:
   a programmed computer that controls the control device; and
   a reset circuit that receives information related to a traveling condition of the bicycle and provides a reset signal to the computer in response to the occurrence of a predetermined traveling condition, wherein the reset circuit comprises:
      a reset signal output circuit; and
      a reset activating circuit that activates the reset signal output circuit in response to the occurrence of the predetermined traveling condition, wherein the reset activating circuit comprises a power switching circuit that switches power to the reset activating circuit to a predetermined state in response to the occurrence of the predetermined traveling condition;
      wherein the reset activating circuit switches a power signal off to the computer in response to the occurrence of the predetermined traveling condition.

26. An electronic control device for controlling a controlled device installed on a bicycle, wherein the control device comprises:
   a programmed computer that controls the control device; and
   a reset circuit that receives information related to a traveling condition of the bicycle and provides a reset signal to the computer in response to the occurrence of a predetermined traveling condition, wherein the reset circuit comprises:
      a reset signal output circuit; and
      a reset activating circuit that activates the reset signal output circuit in response to the occurrence of the predetermined traveling condition, wherein the reset activating circuit comprises a power switching circuit that switches power to the reset activating circuit to a predetermined state in response to the occurrence of the predetermined traveling condition;
      wherein the reset activating circuit switches the power signal off to the reset activating circuit and to the computer in response to the occurrence of the predetermined traveling condition.

27. The device according to claim 26 wherein the reset circuit provides a reset warning signal to the computer prior to providing the reset signal.

* * * * *